(12) United States Patent
Montena

(10) Patent No.: US 7,527,500 B2
(45) Date of Patent: May 5, 2009

(54) SWIVEL WALL PORT FOR COAXIAL CABLE

(75) Inventor: Noah Montena, Syracuse, NY (US)

(73) Assignee: John Mezza lingua Associates, Inc., East Syracuse, NY (US)

( * ) Notice: Subject to any disclaimer, the term of this patent is extended or adjusted under 35 U.S.C. 154(b) by 0 days.

(21) Appl. No.: 11/762,857

(22) Filed: Jun. 14, 2007

(65) Prior Publication Data
US 2008/0311764 A1 Dec. 18, 2008

(51) Int. Cl.
H01R 39/00 (2006.01)

(52) U.S. Cl. .................. 439/8; 439/534; 439/578; 439/654; 439/638; 439/6

(58) Field of Classification Search .............. 439/6, 439/8, 534, 578, 654, 638
See application file for complete search history.

(56) References Cited

U.S. PATENT DOCUMENTS

| 2,180,020 | A |  | 11/1939 | Schott |  |
|---|---|---|---|---|---|
| 2,362,100 | A |  | 11/1944 | Schwartz |  |
| 2,652,546 | A |  | 9/1953 | Christner |  |
| 3,351,728 | A |  | 11/1967 | Miller |  |
| 3,622,684 | A |  | 11/1971 | Press |  |
| 4,275,374 | A | * | 6/1981 | Chaucer | 337/197 |
| 5,002,502 | A | * | 3/1991 | Hill | 439/536 |
| 5,651,696 | A |  | 7/1997 | Jennison |  |
| D399,829 | S |  | 10/1998 | Reed |  |
| 5,816,926 | A | * | 10/1998 | Lynch et al. | 464/114 |
| 5,967,836 | A | * | 10/1999 | Bailey | 439/534 |
| 6,276,962 | B1 |  | 8/2001 | Gaines |  |
| 6,544,069 | B1 | * | 4/2003 | Enriquez et al. | 439/534 |
| 2005/0112939 | A1 |  | 5/2005 | Grzegorzewska et al. |  |

* cited by examiner

Primary Examiner—Tho D Ta
Assistant Examiner—Travis Chambers
(74) Attorney, Agent, or Firm—Christopher R. Pastel; Pastel Law Firm

(57) ABSTRACT

A combination of a swivel port and a wall plate includes a body interconnected with a female connector or a double-female coaxial cable connector such that moving the body moves the connector and vice versa. At least one ridge on the body corresponds to and interoperates with at least one guide channels in an opening in the wall plate which receives the swivel port. The guide channel extends from an inside of the wall plate to an outside of the wall plate, and width of the guide channel at the outside of the wall plate is greater than a width of the guide channel at the inside of the wall plate. The interoperation of the ridge on the body with the guide channel permits movement of the swivel port in two dimensions while prohibiting rotation of the swivel port about a longitudinal axis of the swivel port.

18 Claims, 8 Drawing Sheets

SWIVEL WALL PORT FOR COAXIAL CABLE

FIELD OF THE INVENTION

This invention relates generally to the field of wall jacks and ports, and more particularly to a swivel wall port for a coaxial cable.

BACKGROUND OF THE INVENTION

When a home is wired for coaxial cable service, i.e., for such services as cable television, broadband internet, or digital phone, it is customary for cable within the walls of the home to be terminated with jacks mounted in wall plates. These jacks are typically mounted rigidly in the wall plate. While such rigidity makes tightening connectors to the port/jack easier than otherwise, because the port does not flop or spin within the wall plate, the angle at which the connector and cable project from the port can make it inconvenient to place furniture close to the wall at the site of the wall plate. Some wall plates are known which permit the connector and cable to project downward or sideward at a fixed, non-orthogonal angle to the wall plate. While this capability is useful in some instances, it is not useful in others.

SUMMARY OF THE INVENTION

Briefly stated, a combination of a swivel port and a wall plate includes a body interconnected with a female connector or a double-female coaxial cable connector such that moving the body moves the connector and vice versa. At least one ridge on the body corresponds to and interoperates with at least one guide channels in an opening in the wall plate which receives the swivel port. The guide channel extends from an inside of the wall plate to an outside of the wall plate, and width of the guide channel at the outside of the wall plate is greater than a width of the guide channel at the inside of the wall plate. The interoperation of the ridge on the body with the guide channel permits movement of the swivel port in two dimensions while prohibiting rotation of the swivel port about a longitudinal axis of the swivel port.

According to an embodiment of the invention, a combination of a swivel port and a wall plate includes a body; the body interconnected with a coaxial cable connector such that moving the body moves the connector and vice versa; at least one ridge on the body; the wall plate including an opening therein for receiving the swivel port; a perimeter of the opening including at least one guide channel corresponding to the at least one ridge on the body.

According to an aspect of the invention, the first and second guide channels extend from an inside of the wall plate to an outside of the wall plate, the first and second guide channels each having a first end at the inside of the wall plate and a second end at the outside of the wall plate; and wherein a width of the second ends of the guide channels is greater than a width of the first ends of the guide channels.

According to an embodiment of the invention, a combination of a swivel port and a wall plate includes a body; means for interconnecting the body with a coaxial cable connector such that moving the body moves the connector and vice versa; at least one ridge on the body; the wall plate including an opening therein for receiving the swivel port; and a perimeter of the opening including first means, interoperating with the at lest one ridge on the body, for permitting movement of the swivel port in two dimensions while prohibiting rotation of the swivel port about a longitudinal axis of the swivel port.

According to an embodiment of the invention, a method for making a combination of a swivel port and a wall plate includes the steps of (a) forming a body; (b) forming at least one ridge on the body; (c) interconnecting the body with a coaxial cable connector such that moving the body moves the connector and vice versa; (d) forming an opening in the wall plate for receiving the swivel port; and (e) forming at least one guide channel within a perimeter of the opening which interoperate with the at least one ridge on the body to permit movement of the swivel port in two dimensions while prohibiting rotation of the swivel port about a longitudinal axis of the swivel port.

DETAILED DESCRIPTION OF THE PREFERRED EMBODIMENT

Figure 1:
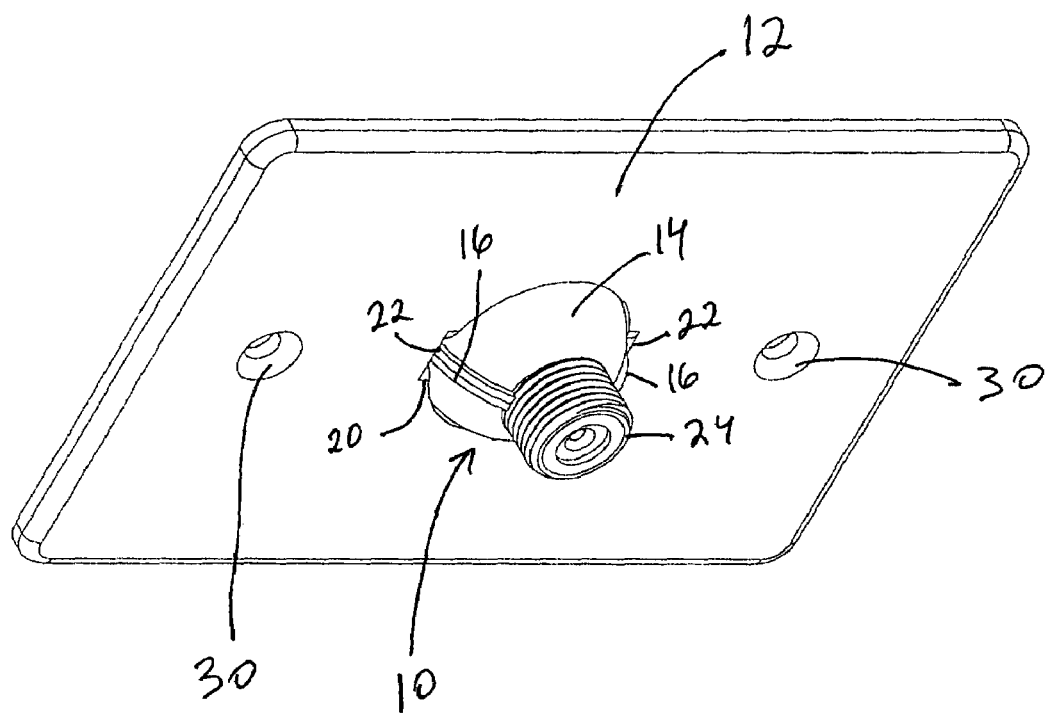
FIG. 1 shows a perspective view of a swivel port and wall plate combination according to an embodiment of the present invention.

Referring to FIGS. 1-4, a swivel port 10 is shown fitted into a back of a wall plate 12. Wall plate 12 preferably includes two screw holes 30 for mounting onto a standard cable receptacle. Swivel port 10 preferably includes a body 14 which surrounds a double female connector 24. Body 14 also preferably includes two ridges 16 on opposing sides of body 14 which fit into two guide channels 22 in an opening 20 in wall plate 12. Ridge 16 and guide channels 22 need not be rectangular, but can be triangular or other shape as long as rotation is prevented.

Figure 2:
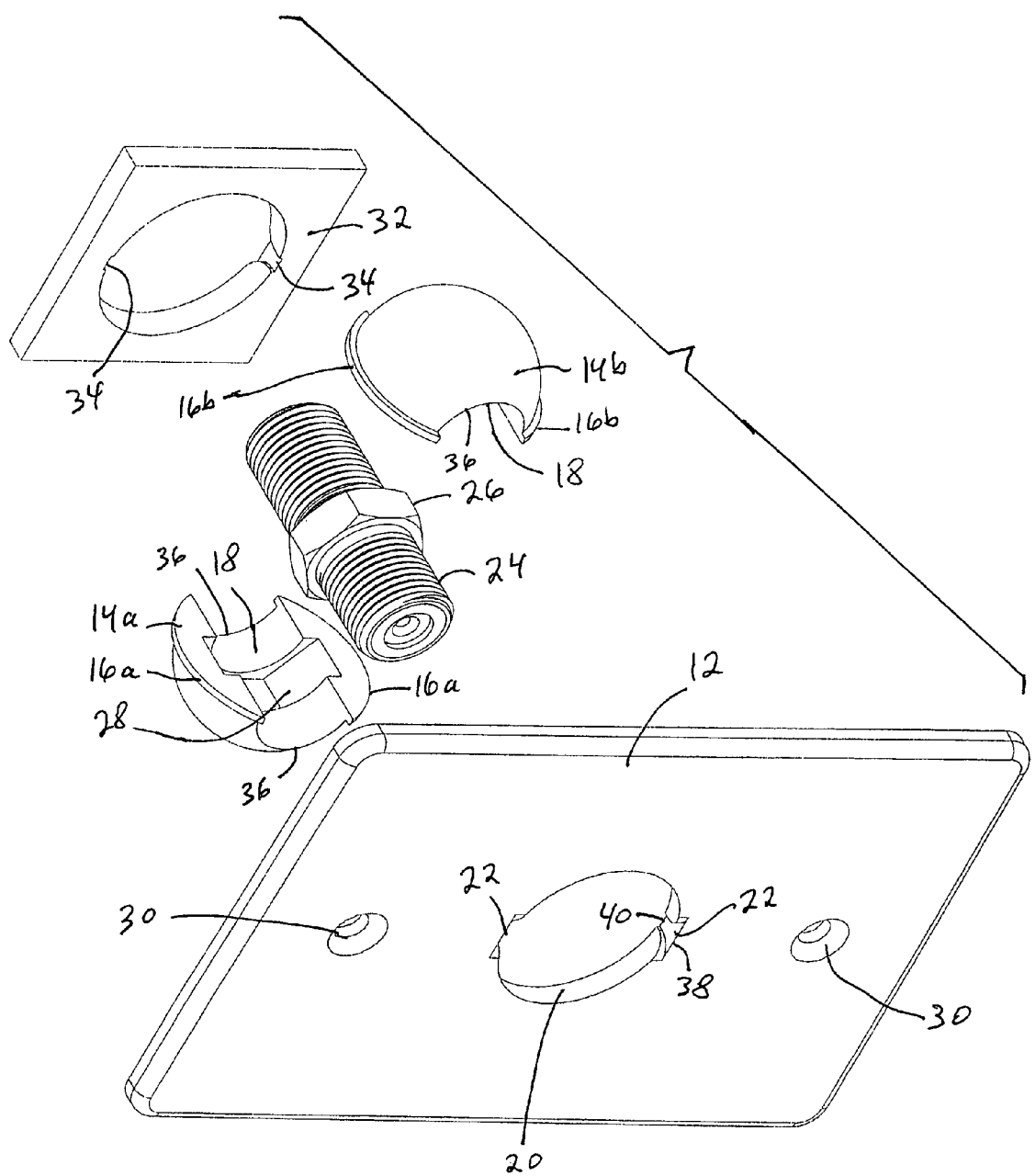
FIG. 2 shows an exploded view of the components of the embodiment of FIG. 1.
Figure 3:
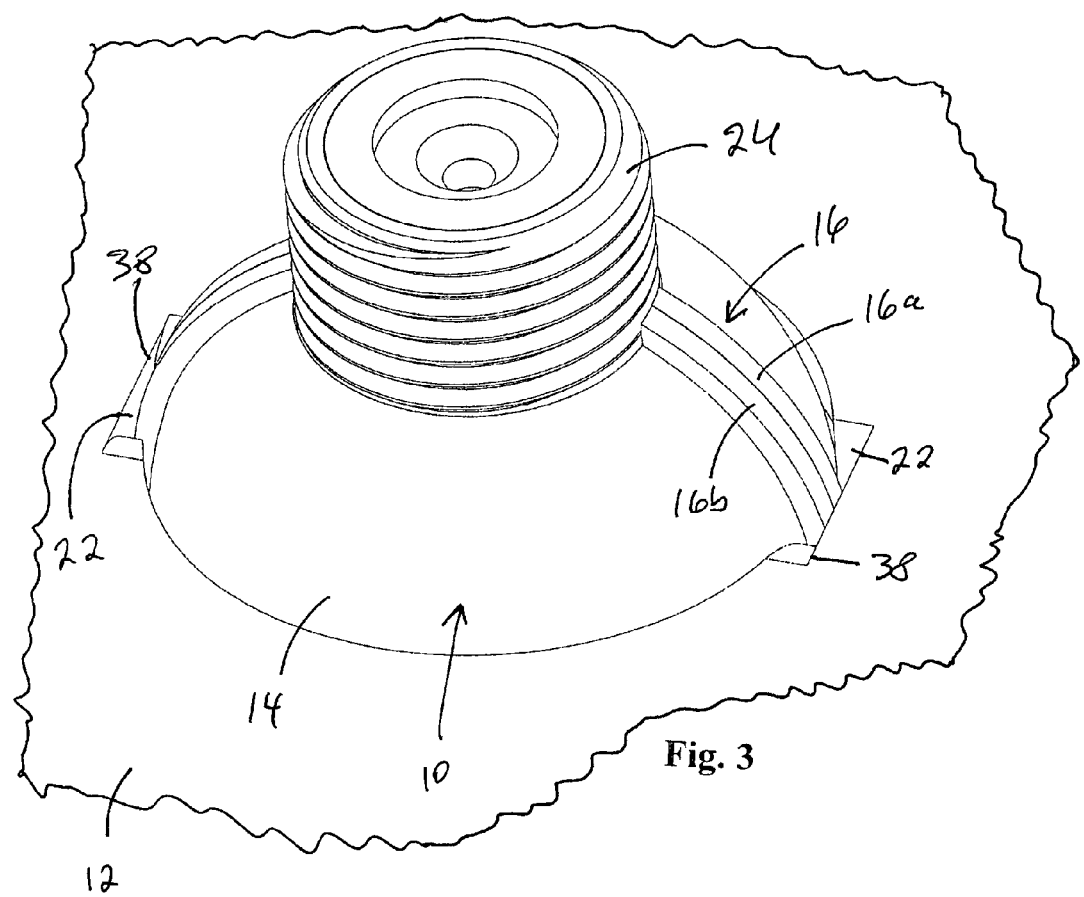
FIG. 3 shows a perspective view of the swivel port and wall plate combination according to the embodiment of FIG. 1.
Figure 4:
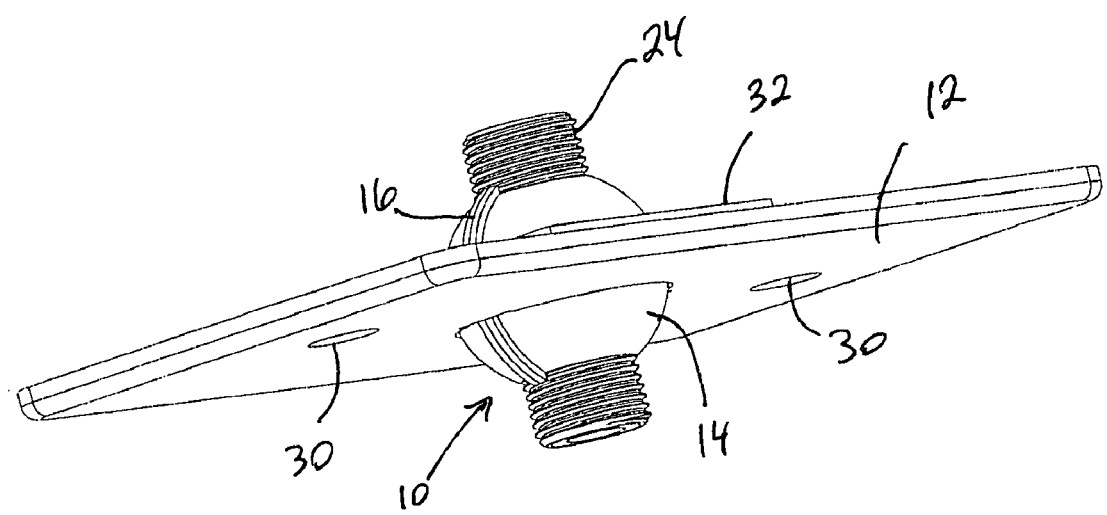
FIG. 4 shows a perspective view of the swivel port and wall plate combination according to the embodiment of FIG. 1.

As best seen in FIG. 2, body 14 preferably includes a first body half 14a and a second body half 14b. The outsides of first and second body halves 14a, 14b are preferably roughly hemispherical in shape with a circular arc at both ends 36. First body half 14a preferably includes two first ridge halves 16a, while second body half 14b preferably includes two second ridge halves 16b. When first and second body halves 14a, 14b are placed together to form body 14, the first and second ridge halves 16a, 16b combine to form the two ridges 16 on body 14.

First and second body halves 14a, 14b preferably each include a cylindrical groove 18, with the ends of cylindrical grooves 18 being the circular arcs at ends 36 mentioned above. Cylindrical grooves 18 are shaped to accommodate double female connector 24 when body 14 is formed around connector 24. In addition, each cylindrical groove 18 preferably includes a shaped recess 28 which corresponds to the shape of a connector nut 26 which is typically centered in the middle of double female connector 24. The fit between shaped recesses 28 and connector nut 26 prevent double female connector 24 from rotating within body 14 when a cable connector is attached to one or both ends of double female connector 24.

A retainer plate 32 is preferably used to fasten swivel port 10 to wall plate 12. Retainer plate 32 preferably includes its own guide channels 34 to accommodate ridges 16 on body 14. Retainer plate is preferably affixed to wall plate 12 in some conventional manner such as by a snap tab, screws, glue, heat staking, or ultrasonic welding.

Guide channels 22 are preferably arcuate on their sides, with a width at a first end 38 of each guide channel 22 being greater than a width at a second end 40 of each guide channel 22. First end 38 is on an outside of wall plate 12, while second end 40 is on an inside of wall plate 12, with the inside of wall plate 12 being next to a wall or other structure. The width of second end 40 of guide channel 22 is only marginally larger than a width of ridge 16, so as to permit rotational movement of body 14 within guide channel 22 in a direction parallel to ridges 16. The greater width of first end 38 permits rotational movement of body 14 in a direction orthogonal to ridges 16. Thus swivel port 10 can wag side to side (parallel to ridges 16) or slide through the confines of guide channels 22, but cannot move laterally, so that the orthogonal axis rotation is prohibited. In other words, the angular curvature of guide channels 22 permits swivel port 10 to rotate around the two axes which are in the plane of wall plate 12, but prevents swivel port 10 from rotating around the axis which is orthogonal to the plane of wall plate 12.

It should be noted that guide channels 22 need not have one end with a width greater than the other end if the port is designed to swivel in only one direction. Accordingly, guide channels 22 can have the same width on the front and back, can have a greater width on the front than on the back, or can have a greater width on the back than on the front.

Figure 5:
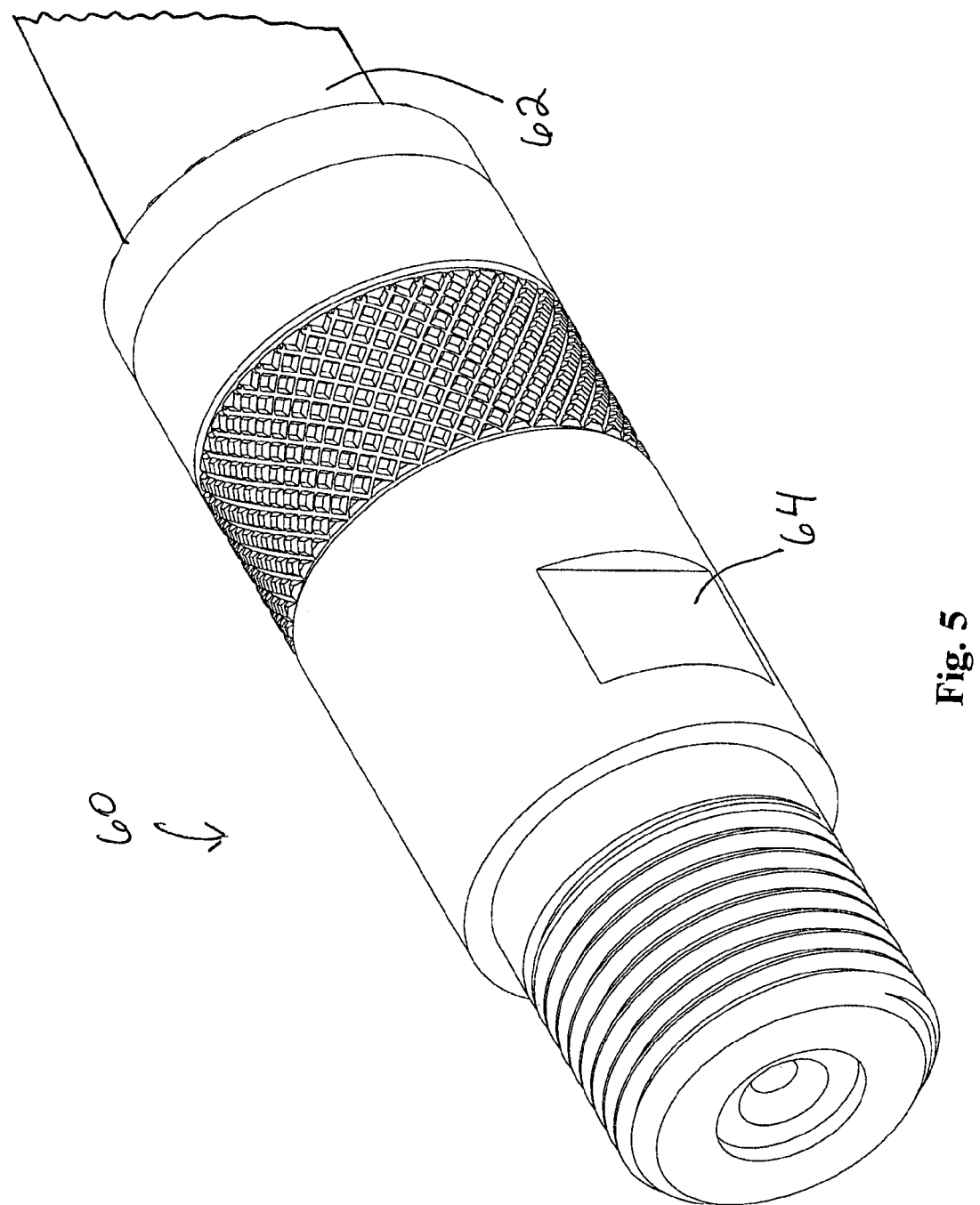
FIG. 5 shows a female connector used in connection with an embodiment of the present invention.

Referring to FIG. 5, a female connector 60 is shown which may be used with an embodiment of the invention. Female connector 60 is shown already connected to a coaxial cable 62 which would remain behind the wall that wall plate 12 is installed on. The embodiment shown in FIGS. 1-4 shows double female connector 24 because that is a very common connector used with wall plates, but the present invention is not limited to use with double female connector 24. All that is necessary for female connector 60 to be used with the present invention is a way to prevent female connector 60 from rotating within swivel port 10. Shown here is one such way, i.e., an anti-rotation locking feature 64 which would cooperate with a corresponding protrusion (not shown) on an inner surface of swivel port 10. There are a variety of anti-rotation features which could be used which are not described here because they are deemed to be within the capability of one of ordinary skill in the art.

Because double female connector 24 and female connector 60 do not need to be separately grounded by swivel port 10, swivel port 10 can be made of almost any material, whether metal or plastic, whether conducting or non-conducting. For ease of manufacturing, durable or tough plastics such as ABS, PC, ABS/PC, or styrenes are satisfactory for the parts, including wall plate 12. Colorable plastics are preferred. The choice of which plastic to use is driven by keeping manufacturing costs low while ensuring that swivel port 10, retainer plate 32, and wall plate 12 do not crack easily.

Figure 6:
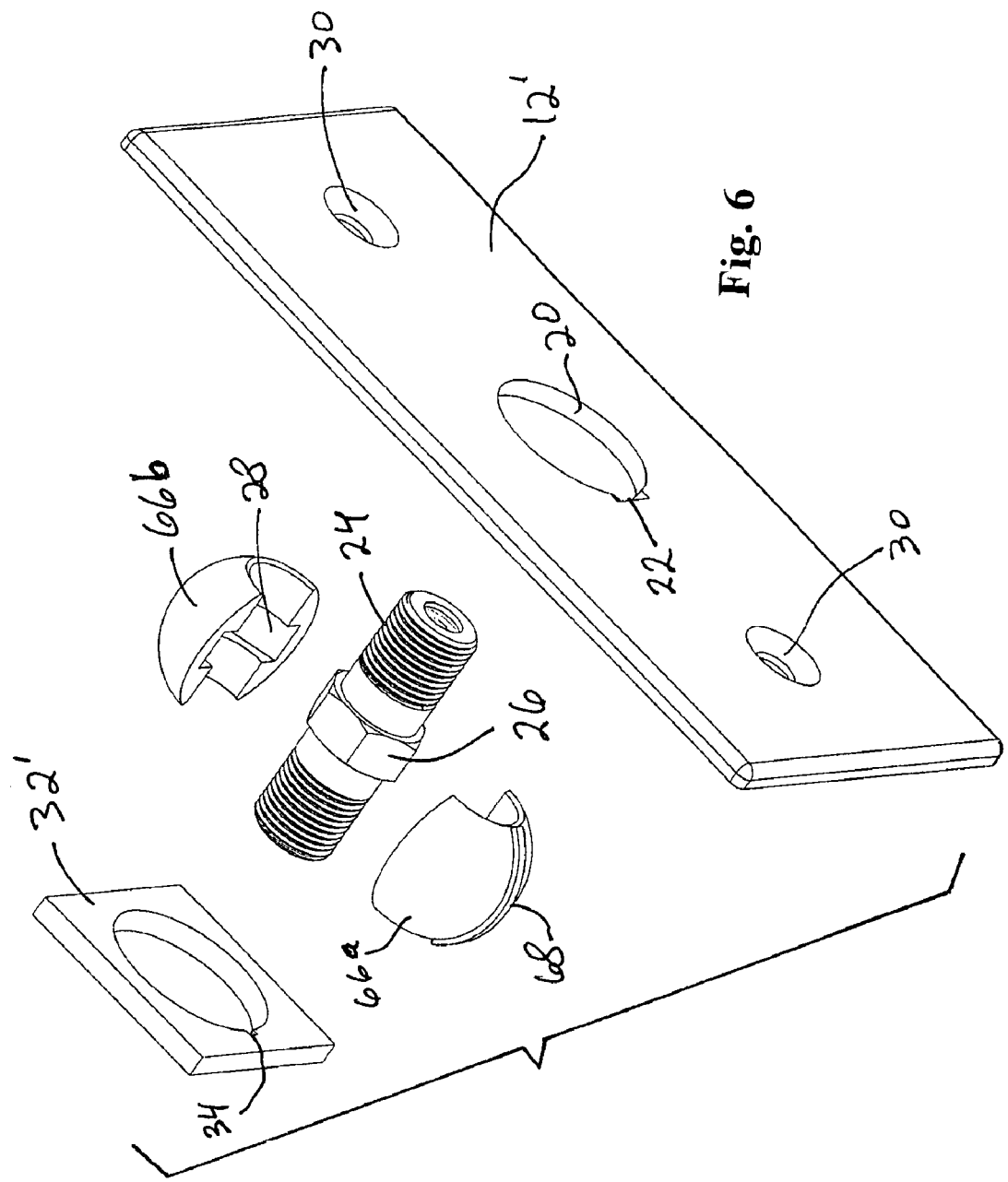
FIG. 6 shows an exploded view of the components of an embodiment of the present invention.
Figure 7:
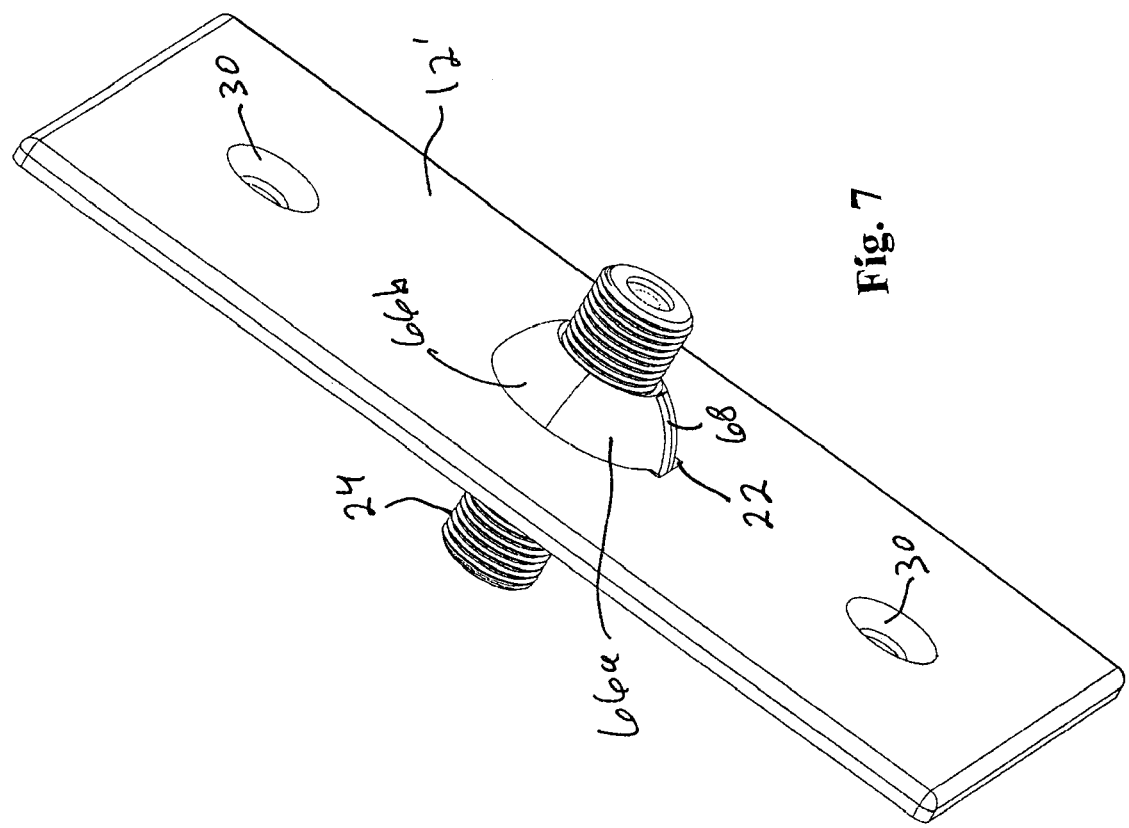
FIG. 7 shows a perspective view of the swivel port and wall plate combination according to the embodiment of FIG. 6.

Referring to FIGS. 6-7, an embodiment of the present invention is shown which includes only one guide channel 22, unlike the previously described embodiment which has two guide channels 22. Note that a wall plate 12' includes only one guide channel 22 in it. Likewise, there is only one ridge 68 on a first body half 66a, while a second body half 66b has no ridge on it. Also, a retainer plate 32' has only one guide channel 34 in it. The preferred embodiment is that with two guide channels 22 as shown in FIGS. 1-4, but any embodiment will work as long as rotation around the longitudinal axis of connector 24 or connector 60 is prevented.

The fit between ridge 16 (or ridge 68) and guide channel(s) 22 should not be too loose, i.e., the clearances can't be so large that body 14 can pop out of its socket or ridge 16 (or ridge 68) pop out of its guide channel(s) 22.

Figure 8:
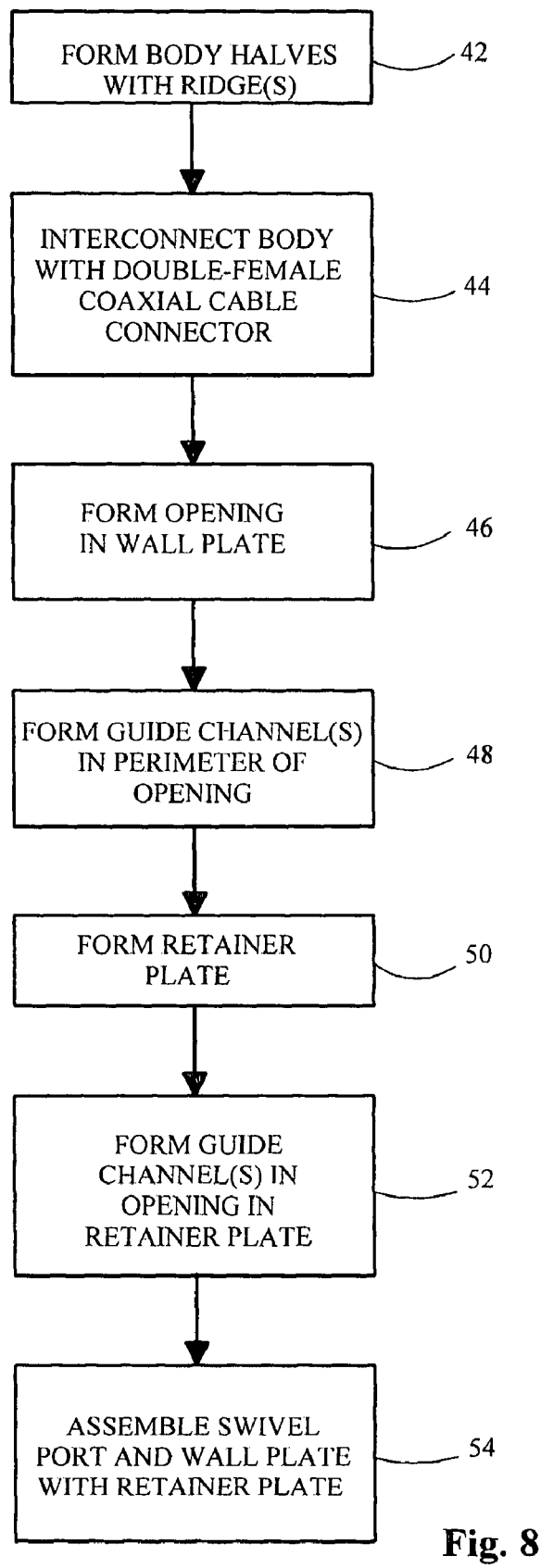
FIG. 8 shows the steps in making the embodiments of the present invention.

Referring to FIG. 8, the method of forming either of the described embodiments is shown, although only the embodiment of FIGS. 1-4 is used by way of example. Swivel port 10 and wall plate 12 are preferably manufactured as follows. In step 42, body halves 14a, 14b are formed with ridge halves 16a, 16b. In step 44, body halves 14a, 14b are closed around double female connector 24. In step 46, opening 20 in wall plate 12 is formed, while in step 48 guide channels 22 are formed in the perimeter of opening 20. In step 50, retainer plate 32 is formed, and in step 52, guide channels 34 are formed in retainer plate 52. In step 54, swivel port 10 is assembled with wall plate 12 and held in place with retainer plate 32.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A combination of a swivel port and a wall plate, comprising:

a body;

the body interconnected with a coaxial cable connector such that moving the body moves the connector and vice versa;

at least one ridge on the body, the ridge being in a same plane as a longitudinal axis of the body;

the wall plate including an opening therein for receiving the swivel port; and a perimeter of the opening including at least one guide channel corresponding to the at least one ridge on the body;

wherein the at least one guide channel extends from an inside of the wall plate to an outside of the wall plate, the at least one guide channel having a first end at the inside of the wall plate a second end at the outside of the wall plate; and wherein a width of the second end of the at least one guide channel is greater than a width of the first end of the at least one guide channel.

2. An apparatus according to claim 1, wherein the retainer plate includes at least one retainer plate guide channel in an opening therein;

wherein the at least one retainer plate guide channel includes first and second retainer plate guide channel ends;

wherein the first retainer plate guide channel end is closest to the wall plate and the second retainer plate guide channel end is further away from the wall plate than the first retainer plate guide channel end; and wherein a width of the second retainer plate guide channel end is larger than a width of the first retainer plate guide channel end.

3. An apparatus according to claim 1, wherein the at least one guide channel extends from an inside of the wall plate to an outside of the wall plate, the at least one guide channel having a first end at the inside of the wall plate and a second end at the outside of the wall plate; and
wherein a width of the second end of the at least one guide channel is equal to a width of the first end of the at least one guide channel.

4. An apparatus according to claim 1, wherein the at least one guide channel extends from an inside of the wall plate to an outside of the wall plate, the at least one guide channel having a first end at the inside of the wall plate and a second end at the outside of the wall plate; and
wherein a width of the second end of the at least one guide channel is less than a width of the first end of the at least one guide channel.

5. An apparatus according to claim 1, further comprising a retainer plate connected to the inside of the wall plate which holds the swivel port in place.

6. An apparatus according to claim 1, wherein the body includes first and second body halves, and wherein the first and second body halves each include first and second ridge halves, such that when the body is formed from the first and second body halves, the first and second ridges on the body are formed from the first and second ridge halves on the first and second body halves.

7. An apparatus according to claim 1, wherein the body includes first and second body halves, and wherein one of the first and second body halves includes the ridge.

8. A combination of a swivel port and a wall plate, comprising:
a body;
means for interconnecting the body with a coaxial cable connector such that moving the body moves the connector and vice versa;
at least one ridge on the body;
the wall plate including an opening therein for receiving the swivel port; and
a perimeter of the opening including first means, interoperating with the at least one ridge on the body, for permitting movement of the swivel port in two dimensions while prohibiting rotation of the swivel port about a longitudinal axis of the swivel port;
wherein the body includes first and second body halves, and wherein one of the first and body halves includes the ridge.

9. An apparatus according to claim 8, further comprising retainer means for retaining the swivel port onto the wall plate.

10. An apparatus according to claim 9, wherein the retainer means includes second means for interoperating with the at least one ridge on the body, for permitting movement of the swivel port in two dimensions while prohibiting rotation of the swivel port about the longitudinal axis of the swivel port.

11. An apparatus according to claim 10, wherein the second means includes at least one retainer plate guide channel in an opening in the retainer means;
wherein the at least one retainer plate guide channel includes first and second retainer plate guide channel ends;
wherein the first retainer plate guide channel end is closest to the wall plate and the second retainer plate guide channel end is further away from the wall plate than the first retainer plate guide channel end; and p1 wherein a width of the second retainer plate guide channel end is larger than a width of the first retainer plate guide channel end.

12. A method for making a combination of a swivel port and a wall plate, comprising the steps of:
forming a body;
forming at least one ridge on the body;
interconnecting the body with a coaxial cable connector such that moving the body moves the connector and vice versa;
forming an opening in the wall plate for receiving the swivel port; and
forming at least one guide channel within a perimeter of the opening which interoperates with the at least one ridge on the body to permit movement of the swivel port in two dimensions while prohibiting rotation of the swivel port about a longitudinal axis of the swivel port;
forming first and second guide channels in a perimeter of the opening corresponding to the at least one ridge on the body;
the at least one guide channel extending from an inside of the wall plate to an outside of the wall plate, the at least one guide channel having a first end at the inside of the wall plate and a second end at the outside of the wall plate; and
wherein a width of the second ends of the guide channels is greater than a width of the first ends of the guide channels.

13. A method according to claim 12, comprising the steps of forming at least one retainer plate guide channel in an opening in the fastener;
wherein the at least one retainer plate guide channel includes first and second retainer plate guide channel ends;
wherein the first retainer plate guide channel end is closest to the wall plate and the second retainer plate guide channel end is further away from the wall plate than the first retainer plate guide channel end; and
wherein a width of the second retainer plate guide channel end is larger than a width of the first retainer plate guide channel end.

14. A method according to claim 12, wherein the step of forming the body includes the step of forming first and second body halves, wherein the first and second body halves each include first and second ridge halves, such that when the body is formed from the first and second body halves, the first and second ridges on the body are formed from the first and second ridge halves on the first and second body halves.

15. An method according to claim 12, wherein the body includes first and second body halves, and wherein one of the first and second body halves includes the ridge.

16. A method according to claim 12, further comprising the step of forming a retainer plate for retaining the swivel port in the wall plate.

17. A method according to claim 16, further comprising the steps of:
fitting the swivel port into the opening in the wall plate;
fitting the retainer plate over the swivel port; and
fastening the retainer plate to an inside of the wall plate.

18. A method according to claim 17, wherein the retainer plate interoperates with the at least one ridge on the body to permit movement of the swivel port in two dimensions while prohibiting rotation of the swivel port about the longitudinal axis of the swivel port.

* * * * *